Feb. 10, 1948.  R. A. WYDRO  2,435,863
DENTIST'S AND SURGEON'S SAW
Filed Sept. 26, 1945
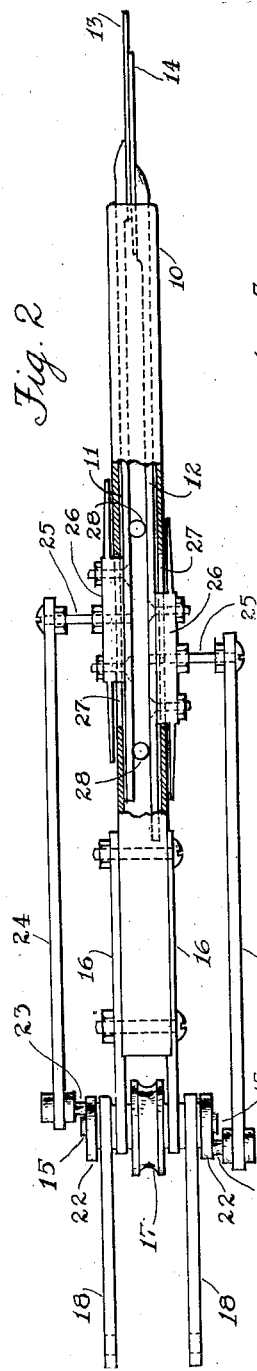
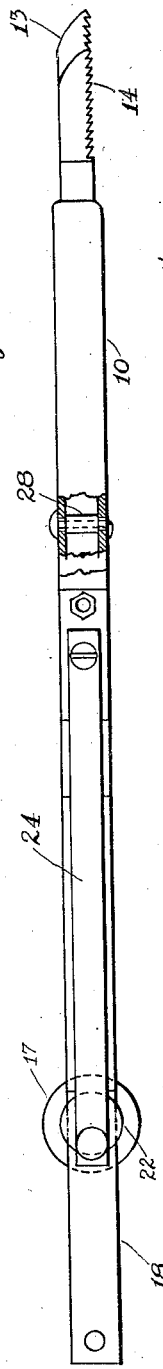
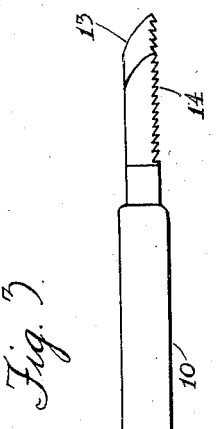
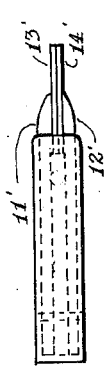
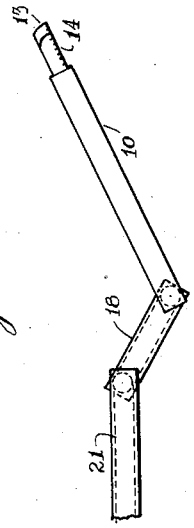
INVENTOR
Robert A. Wydro
BY Edw. S. Higgins
ATTORNEY Patented Feb. 10, 1948

2,435,863

UNITED STATES PATENT OFFICE 2,435,863

DENTIST'S AND SURGEON'S SAW

Robert A. Wydro, Brooklyn, N. Y.

Application September 26, 1945, Serial No. 618,725

1 Claim. (Cl. 128—317)

This invention relates particularly to a power driven dentist's and surgeon's saw for cutting a jaw bone or the like.

In operating on the inside of the mouth, such as cutting a jaw bone for the purpose of extracting a tooth, it is absolutely necessary that the cutting be done quickly in the shortest possible time in order to prevent pain and suffering, loss of blood and other harmful effects on the patient. Because of the flow of blood caused by the operation, and the difficulty in gaining access to such parts of the mouth due to the cramped space in which the dentist has to work, it is necessary to provide a short powerful stroke with no deflections or displacement of the cutting edge.

A primary object of my invention is to provide a power driven saw with two reciprocating blades so arranged that the cutting action is continuous.

A further action is to provide such a saw in which the blade is always in position for cutting and does not leave the cut so that it is not necessary to reinsert it as in the ordinary saws.

Another object is to provide such a saw with two reciprocating blades, the teeth of which are disposed in different directions to provide a pushing and pulling action at all times during the cutting action.

Still another object is to provide such a saw in which there is a continuous powerful cutting stroke.

Yet another object is to provide such a saw that is simple and compact in construction, economical to manufacture and positive and effective in action.

Other objects and advantages of my invention will be apparent from the description thereof to follow taken in connection with the accompanying drawing in which—

Fig. 1 is a side view of my improved saw operatively connected to a power driving device.

Fig. 2 is a top plan view of said saw on an enlarged scale, parts being broken away and in section.

Fig. 3 is a side view of the device of Fig. 2, parts being broken away.

Fig. 4 is a fragmentary side view of a modified form of the invention, parts being broken away and in section.

Fig. 5 is a top plan view of the device of Fig. 4.

Referring to the drawing, my improved saw comprises an elongated metal casing or housing 10, substantially square in cross section. Slidable in the housing are two elongated bars 11 and 12 extending substantially the length of the housing. A saw blade 13 is fastened to the outer end of bar 11 by welding, soldering or in any other suitable manner. A similar blade 14 is similarly fastened to the outer end of bar 12. The blades are fastened to the adjacent surfaces of the bars so that they are positioned close to each other with little or no space between them so as to present a blade of narrow width. The teeth of blade 13 point in one direction and the teeth of blade 14 point in the opposite direction as seen in Fig. 3. The outer end of each blade curves to a point.

The mechanism for reciprocating the bars 13 and 14 comprises a shaft 15 supported by and extending across two plates 16, 16 which are secured to the inner end of the housing and form a rear extension thereof. A grooved pulley 17 is fastened to the shaft 15 between the plates. A pair of arms 18, 18 are hingedly connected at one end to the shaft 15 and at the other end to an arm 19 which supports a drive pulley 20 operated by a flexible drive belt 21 connected to a source of power, such as an electric motor (not shown). Concentrically mounted on shaft 15 outside of the arms 18, 18 are disc or crank members 22, 22. Positioned on the cranks 22, 22 adjacent their peripheries and eccentrically arranged relative to the axis of the shaft 15 are crank pins 23, 23. Links or rods 24, 24 have one of their ends connected to said crank pins and their other ends connected to pins or shafts 25, 25. The shafts 25, 25 pass through plates or blocks 26, 26 slidable on the outer surface of opposite sides of the housing and are connected at their inner ends to bars 13 and 14. Elongated slots 27, 27 on the opposite sides of the housing covered by plates 26, 26 permit reciprocation of the shafts 25, 25 to carry the drive to the bars. Rollers 28, 28 may be provided between the bars to facilitate movement thereof.

In operation, the power is brought from the flexible drive belt 21 to a flexible belt 29 which drives the pulley 17 for turning shaft 15. Due to the eccentric mounting of the ends of the rods 24, 24, such rods are driven alternately so that there is an alternate drive of bars 13 and 14 with their blades reciprocating back and forth close to each other. Owing to the arrangement of the blades there is always one blade in the cut so that there is no necessity for repositioning of the blade as in the ordinary saws and there is no chance of displacing the blade. Also because of the opposed arrangement of the teeth of the blades, there is a continuous pushing and pulling sawing action.

In the form of the invention shown in Figs. 4 and 5, the outer ends of the elongated sliding bars 11 and 12 support short bars 11' and 12', respectively, at right angles thereto. These bars 11' and 12' are enclosed in a casing 10' suitably secured to the end of housing 10. At the outer free ends of the bars 11' and 12' are fastened blades 13' and 14', respectively, which reciprocate with the sliding bars. This form of saw is adapted for use in reaching parts inside of the mouth that cannot be reached conveniently by the form of Fig. 1.

It will be understood that instead of the above described mechanism for driving the pulley 17, an overhung crank drive, or a center crank drive or an eccentric central drive may be used.

The elongated housing which serves as a handle permits the hand of the operator to be kept away from the mouth giving full vision to the interior of the mouth so that the blades can be properly positioned to start the cutting. The hinged mounting of the housing permits ready manipulation and adjustment of the tool.

It will be understood that my improved saw may be used by surgeons for cutting any part of the anatomy, and that changes in details of construction may be made without departing from the principle of the invention.

I claim:

A power driven saw consisting of an elongated casing having elongated slots in its side walls, an extension on said casing extending at right angles thereto, two elongated slidable bars arranged side by side in said casing, integral extensions formed on said bars and extending at right angles thereto through the extension of said casing and protruding exteriorly of said casing extension, the outer protruding end of each bar extension being formed as a saw blade with the teeth extending parallel to the elongated casing, the teeth of said blades being disposed in opposite directions, means for alternately reciprocating said bars including a drive shaft operatively connected to a source of electric motive power, link members having their ends eccentrically connected to said shaft, plates slidable on the casing and connected through the elongated slots in the casing to the sliding bars therein and means for connecting said plates to said link members.

ROBERT A. WYDRO.

REFERENCES CITED

The following references are of record in the file of this patent:

UNITED STATES PATENTS

| Number | Name | Date |
|---|---|---|
| 1,726,863 | Singer | Sept. 3, 1929 |

FOREIGN PATENTS

| Number | Country | Date |
|---|---|---|
| 466,515 | France | May 15, 1914 |
| 465,130 | France | Apr. 8, 1914 |